United States Patent
Bonanno et al.

(10) Patent No.: US 9,891,922 B2
(45) Date of Patent: *Feb. 13, 2018

(54) SELECTIVELY BLOCKING BRANCH PREDICTION FOR A PREDETERMINED NUMBER OF INSTRUCTIONS

(75) Inventors: James J. Bonanno, Wappingers Falls, NY (US); Ulrich Mayer, Weil im Schoenbuch (DE); Anthony Saporito, Highland, NY (US); Chung-Lung K. Shum, Wappingers Falls, NY (US); Timothy J. Slegel, Staatsburg, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 920 days.

This patent is subject to a terminal disclaimer.

(21) Appl. No.: 13/524,402

(22) Filed: Jun. 15, 2012

(65) Prior Publication Data

US 2013/0339696 A1    Dec. 19, 2013

(51) Int. Cl.
*G06F 9/38*    (2006.01)
*G06F 9/30*    (2006.01)

(52) U.S. Cl.
CPC ............ *G06F 9/38* (2013.01); *G06F 9/30076* (2013.01); *G06F 9/3844* (2013.01); *G06F 9/3848* (2013.01)

(58) Field of Classification Search
CPC ....... G06F 9/325; G06F 9/3848; G06F 9/3844
See application file for complete search history.

(56) References Cited

U.S. PATENT DOCUMENTS

| | | | | |
|---|---|---|---|---|
| 5,228,131 A | * | 7/1993 | Ueda et al. | 712/240 |
| 5,303,358 A | | 4/1994 | Baum | |
| 5,832,260 A | | 11/1998 | Arora et al. | |
| 5,909,573 A | * | 6/1999 | Sheaffer | 712/240 |
| 5,978,908 A | | 11/1999 | Cumming et al. | |
| 6,003,128 A | * | 12/1999 | Tran | 712/241 |

(Continued)

FOREIGN PATENT DOCUMENTS

| | | |
|---|---|---|
| CN | 1782988 | 6/2006 |
| CN | 101101544 | 1/2008 |

(Continued)

OTHER PUBLICATIONS

Using gcc to assemble your programs, Oct. 3, 2000, 3 pages, [retrieved from the internet on May 12, 2016], retrieved from URL <www.enchantedlearning.com/sparc/mechanics/gcc.shtml>.*

(Continued)

*Primary Examiner* — Jyoti Mehta
(74) *Attorney, Agent, or Firm* — Cantor Colburn LLP; William A. Kinnaman, Jr.

(57) ABSTRACT

Embodiments relate to selectively blocking branch instruction predictions. An aspect includes a computer system for performing selective branch prediction. The system includes memory and a processor, and the system is configured to perform a method. The method includes detecting a branch-prediction blocking instruction in a stream of instructions and blocking branch prediction of a predetermined number of branch instructions following the branch-prediction blocking instruction based on the detecting the branch-prediction blocking instruction.

9 Claims, 7 Drawing Sheets

(56) References Cited

U.S. PATENT DOCUMENTS

| | | | |
|---|---|---|---|
| 6,282,663 B1* | 8/2001 | Khazam | G06F 1/32 712/233 |
| 7,725,695 B2 | 5/2010 | Williamson et al. | |
| 2006/0149944 A1 | 7/2006 | Eisen et al. | |
| 2006/0271770 A1 | 11/2006 | Williamson et al. | |
| 2007/0130450 A1* | 6/2007 | Chiao et al. | 712/239 |
| 2011/0047357 A1* | 2/2011 | Stempel et al. | 712/220 |
| 2012/0124333 A1* | 5/2012 | Master et al. | 712/30 |
| 2012/0124344 A1* | 5/2012 | Jarvis | G06F 9/3806 712/230 |

FOREIGN PATENT DOCUMENTS

| | | |
|---|---|---|
| EP | 0463965 | 1/1992 |
| EP | 0592125 | 4/1994 |

OTHER PUBLICATIONS

Ekanadham, et al. "Multisequencing a Single Instruction Stream using Type_B Branches to Reduce Branch Wrong Guess Penalty", IPCOM000104472D pp. 1-5, (1993).

Larson, et al., "Compiler Controlled Value Prediction using Branch Predictor Based Confidence", Electrical Engineering and Computer Science, University of Michigan, pp. 327-336, (2000).

Liu "Branch History Indexing with Execution Path Information", IPCOM000105644D, pp. 1-3, (1993).

CN Appcation No. 201310235141.7 Search Report dated Jun. 2, 2015, 11 pages.

Bhargave, B.; John, L.K.: Performance and Energy Impact of Instruction-Level Value Predictor Filtering, 2003. URL: http://citeseerx.ist.psu.edu/viewdoc/summary?doi=10.1.1.14.4218 [abgerufen am Mar. 29, 2016], 8 pages.

Grunwald, D. [u.a.]: Confidence estimation for speculation control. In: The 25th Annual International Symp. on Computer Arch., 1998. Proceedings, 1998, S. 122-131.-ISSN 1063-6897, http://dx.doi.org/10.1109/ISCA.1998.694768 [abgerufen am Mar. 30, 2016], 10 pages.

Huang, M.C. [u.a.]: Customizing the Branch Predictor to Reduce Complexity and Energy Consumption. In: IEEE Micro, 23, 2003, 5, S. 12-25.—ISSN 0272-1732. http://www.ece.rochester.edu/~mihuang/PAPERS/ieeemicro03.pdf [abgerufenam Mar. 29, 2016]. [preprint], 14 pages.

Shen, J.P.: EE382A Advanced Processor Architecture, Lecture 6: Register Renaming, Dept. of Electrical Engineering, Stanford Univ, 2009. URL:http://web.stanford.edu/class/ee382a/handouts.html [abgerufen am Mar. 30, 2016], 10 pages.

* cited by examiner

SELECTIVELY BLOCKING BRANCH PREDICTION FOR A PREDETERMINED NUMBER OF INSTRUCTIONS

BACKGROUND

The present embodiments relate to selectively blocking branch instruction prediction, and more particularly to providing an instruction within a stream of instructions to be executed to block branch prediction of a predetermined number of future branch instructions.

Processors use pipelines to increase the speed with which an instruction stream may be processed. The pipeline may have a number of processing stages, and as one instruction is processed in one stage, a next instruction may be processed in an upstream stage. When the stream of instructions includes a branch instruction, the processor may need to execute the branch instruction, or run the branch instruction through the whole pipeline, to determine a next instruction to execute. To increase efficiency, processors may determine when the instruction stream includes a branch instruction and may predict which instruction should follow the branch instruction in the pipeline.

However, incorrect predictions by the processor may result in decreased processing efficiency. For example, if the processor predicts a next instruction to follow a conditional branch instruction, but the branch is not taken, then the next instruction and any subsequent instructions that have been processed at various stages of the pipeline must be cleared, and new instructions from the original stream including the branch instruction must be provided at the start of the pipeline. As a result, upstream stages of the pipeline may stand idle for multiple cycles following an incorrect branch prediction.

SUMMARY

Exemplary embodiments include a computer system for performing selective branch prediction. The system includes memory configured to store instructions and a processor configured to execute the instructions to control the computer system to perform functions indicated by the instructions. The system is configured to perform a method, which includes detecting, by the processor, a branch-prediction blocking instruction in a stream of instructions and blocking, by the processor, branch prediction of a predetermined number of branch instructions following the branch-prediction blocking instruction based on the detecting the branch-prediction blocking instruction.

Additional exemplary embodiments include a computer implemented method for performing selective branch prediction. The method includes detecting, by the processor, a branch-prediction blocking instruction in a stream of instructions and blocking, by the processor, branch prediction of a predetermined number of branch instructions following the branch-prediction blocking instruction based on the detecting the branch-prediction blocking instruction.

Further exemplary embodiments include a computer program product for performing selective branch prediction. The computer program product includes a tangible storage medium readable by a processing circuit and storing instructions for execution by the processing circuit for performing a method. The method includes detecting, by the processor, a branch-prediction blocking instruction in a stream of instructions and blocking, by the processor, branch prediction of a predetermined number of branch instructions following the branch-prediction blocking instruction based on the detecting the branch-prediction blocking instruction.

Additional features and advantages are realized through the techniques of the disclosed embodiments. Other embodiments and aspects of the disclosure are described in detail herein. For a better understanding of the embodiments with the advantages and the features, refer to the description and to the drawings.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

In exemplary embodiments, a branch prediction blocking instruction in a stream of instructions prevents a branch prediction function from being performed on a predetermined number of branch instructions following the blocking instruction.

Figure 1:
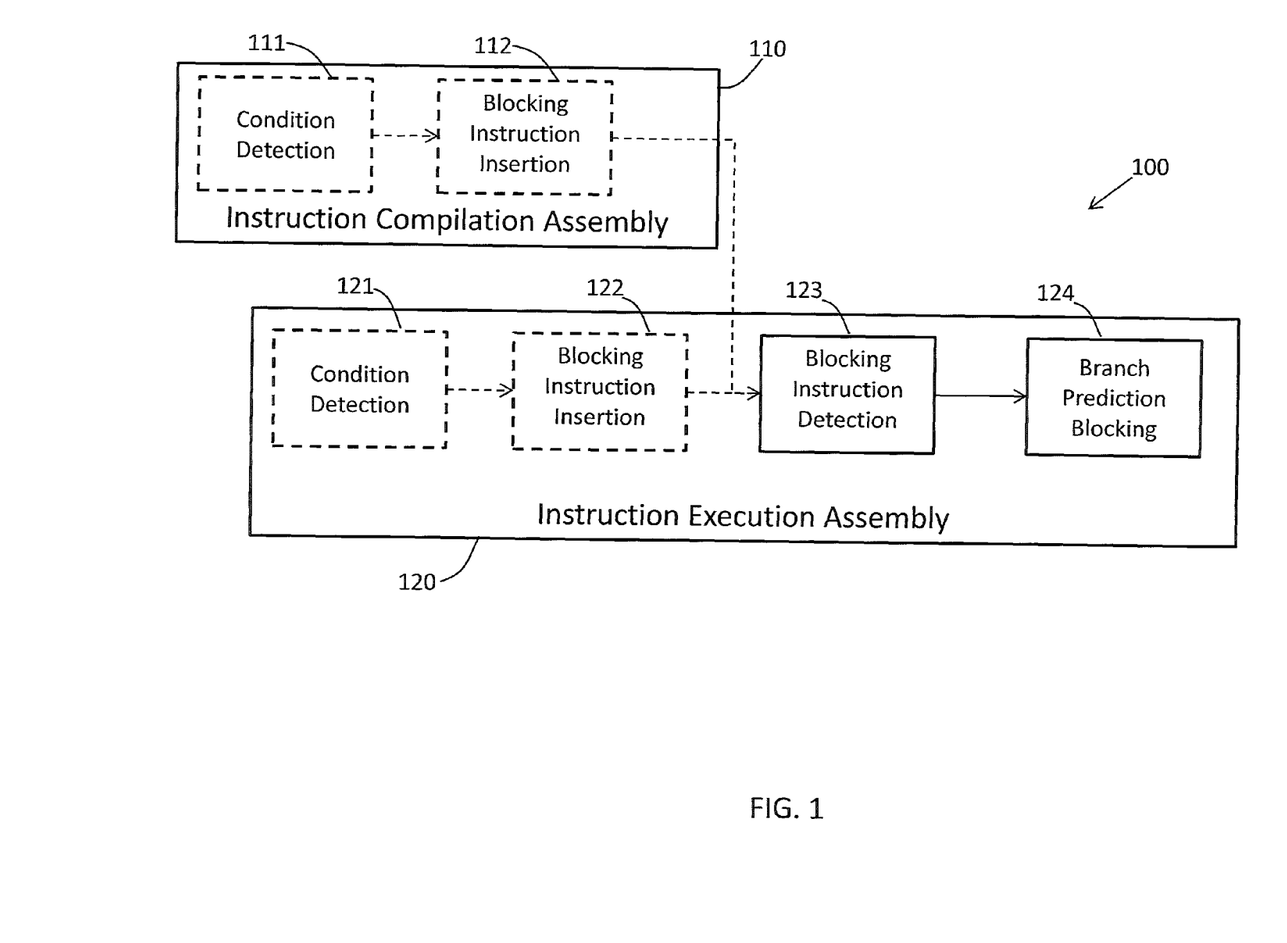
FIG. 1 illustrates a block diagram of a selective branch prediction blocking system according to one embodiment of the present disclosure.

FIG. 1 illustrates a functional block diagram of a selective branch prediction blocking system 100 according to an embodiment of the present disclosure. The system 100 may include an instruction compilation assembly 110 and an instruction execution assembly 120. The instruction compilation assembly 110 may receive as an input computer code in a high-level computer programming language and may convert the computer code to executable instructions. The instruction compilation assembly 110 may include a blocking instruction insertion module 112 that inserts a branch prediction blocking instruction into a stream of instructions in either the computer code or the executable instructions. The blocking instruction insertion module 112 may be controlled by a user or by a computer program. For example, the instruction compilation assembly 110 may include a condition detection module 111 configured to recognize a predetermined condition within one or more of the high-level programming code, an intermediate programming code, or the executable instructions. If the condition is detected, the condition detection module 111 may transmit a signal or instruction to the blocking instruction insertion module 112 to instruct the blocking instruction insertion module to insert a branch prediction blocking instruction in a stream of instructions.

While FIG. 1 illustrates a condition detection module 111 and blocking instruction insertion module 112, embodiments of the present disclosure encompass any means of providing a branch prediction blocking instruction in a stream of instructions. For example, a user may insert a blocking instruction into programming code or executable instructions, and the instruction execution assembly 120 may execute the blocking instruction in a stream of instructions. In other words, insertion of the blocking instruction may be based on analysis by an instruction compilation assembly, or by analysis by a user who may use the instruction compilation assembly 110 to insert the blocking instruction into a stream of instructions at a stage of writing programming code, writing intermediate code, or writing processor-executable instructions.

A condition that may be detected by the condition detection module 111 may include detecting a certain type of branch instruction, detecting a certain type of code in which the branch instruction resides, detecting particular addresses, operands, or registers accessed by the branch instruction, detecting that the branch instruction is a specific pre-designated branch instruction, or any other condition. For example, a particular branch instruction may resolve in the branch not being taken 60% of the time, while performing branch prediction may result in a correct prediction rate of 10%. The particular branch instruction may be identified as being difficult to predict or unpredictable, and a user or condition detection module 111 may insert a blocking instruction into a stream of instructions upstream of the unpredictable instruction. As a result, when the stream of instructions is executed, the unpredictable instruction may not have branch prediction performed.

The instruction execution assembly 120 executes a stream of instructions by fetching, decoding, issuing, and executing the instructions. The instruction execution assembly 120 may further include a condition detection module 121 to detect a condition in the stream of instructions, and a blocking instruction insertion module 122 to insert a blocking instruction into the stream of instructions based on detecting the condition by the condition detection module 121. The condition detection modules 111 and 121 and the blocking instruction insertion modules 112 and 122 are represented with dashed lines to indicate that embodiments of the present disclosure encompass a selective branch prediction blocking system 100 including all of the condition detection modules 111 and 121 and the blocking instruction insertion modules 112 and 122, including only the condition detection module 111 and the blocking instruction insertion module 112, including only the condition detection module 121 and the blocking instruction insertion module 122, including only one or both of the blocking instruction insertion modules 112 or 122, or including none of the condition detection modules 111 and 121 and the blocking instruction insertion modules 112 and 122. In such an example, a user may draft code in a programming language that is executed normally by the instruction compilation assembly 110 and provided to the instruction execution assembly 120 for execution without conditions being detected by the instruction compilation assembly 110 or the instruction execution assembly 120.

A condition that may be detected by the condition detection module 121 may include detecting a certain type of branch instruction, detecting a certain type of code in which the branch instruction resides, detecting particular addresses, operands, or registers accessed by the branch instruction, detecting that the branch instruction is a specific pre-designated branch instruction, or any other condition.

The instruction execution assembly includes a blocking instruction detection module 123 for detecting the blocking instruction in the stream of instructions. When the blocking instruction is detected, the blocking instruction detection module 123 controls the branch prediction blocking module 124 to skip or block branch prediction of a predetermined number of branch instructions following the blocking instruction. The blocking instruction detection module 123 may control the branch prediction blocking module 124 to block every branch instruction, every conditional branch instruction, particular classes or types of branch instructions, or specific branch instructions having particular target addresses.

Once the predetermined number of branch instructions has been skipped or blocked, the branch prediction blocking module 124 may automatically resume performing branch prediction operations on the branch instructions specified by the blocking instruction. In one embodiment, the predetermined number of branch instructions is programmable and changeable. For example, the blocking instruction may include an integer representing the number of branch instructions for which branch prediction operations will be skipped or blocked. In another embodiment, the blocking instruction may contain no explicit information regarding a number of branch instructions to be skipped or blocked, and the blocking instruction detection module 123 may supply a default number of branch instructions to be skipped, where the default number is a finite number.

For example, the condition detection module 111 may detect a particular branch instruction during compiling, where the particular branch instruction is defined as a branch instruction for which branch prediction should not be performed. The condition detection module 111 may indicate to the blocking instruction insertion module 112 that the particular branch instruction has been detected, and the blocking instruction insertion module 112 may insert a branch prediction blocking instruction in the executable instructions upstream from the particular branch instruction. The branch prediction blocking instruction may include an integer of "1" to indicate to the instruction execution assembly that only one following branch instruction should have branch prediction operations skipped.

In another example, the condition detection module 111 may detect a particular type of code being compiled, such as code designated as being "sensitive" for which branch predictions should not be performed. The condition detection module 111 may indicate to the blocking instruction insertion module 112 that the particular type of code has been detected, and the blocking instruction insertion module 112 may insert a branch prediction blocking instruction in the executable instructions upstream from the particular type of code. The blocking instruction insertion module 112 may determine a number of branch instructions located in the sensitive code, and may generate a branch prediction blocking instruction to indicate to the instruction execution assembly that only the number of branch instructions corresponding to the number of branch instructions in the sensitive code should have branch prediction operations skipped. The blocking instruction insertion module 112 may insert the blocking instruction a predetermined number of instructions upstream from the sensitive code, such that when the blocking instruction is executed by the instruction execution assembly 120, the sensitive code may not yet be in an instruction execution pipeline, thereby preventing lost processing time by preventing branch prediction when a branch of the sensitive code is fetched.

Although an example of "sensitive" code is described above for purposes of illustration, it is understood that embodiments of the present disclosure encompass inserting instructions to block branch predictions based on detecting any predetermined or pre-designated type of instructions or block of instructions.

In another example, the instruction execution assembly 120 may determine, based on a history of executed branch operations, that a particular type of branch instruction is unpredictable, or has a successful branch prediction less than a predetermined threshold. The instruction execution assembly 120 may instruct the condition detection module 121 to detect the particular type of branch instruction. The particular branch instruction may be identified, for example, by identifying an address of the branch instruction and an address of a next instruction targeted by the branch instruction. When the condition detection module 121 detects the particular type of branch instruction, the condition detection module 121 controls the blocking instruction insertion module 122 to insert an instruction into a stream of instructions being executed to skip or block branch prediction of the particular instruction. The blocking instruction insertion module 122 may provide an integer, such as "1", within the instruction to indicate to the branch prediction blocking module 124 that only one following branch instruction should have a branch prediction function skipped or blocked.

In one embodiment, the particular branch instruction is located in a stream of code, and the blocking instruction insertion module 122 inserts the blocking instruction into the stream of code upstream from the particular branch instruction. The blocking instruction may be inserted far enough upstream from the particular branch instruction that when the stream of instructions is provided to an instruction execution pipeline, the particular branch instruction may not be decoded yet when the blocking instruction executes.

The blocking instruction detection module 123 detects the blocking instruction including the integer indicating a number of branch instructions for which the branch prediction should be skipped or blocked. The branch prediction blocking module 124 blocks the predetermined number of branch instructions from having branch prediction performed, and clears the blocking instruction to perform branch prediction on the particular type of branch instruction in the stream of instructions after the predetermined number of branch instructions indicated by the blocking instruction has been skipped or blocked from having branch prediction performed.

Figure 2:
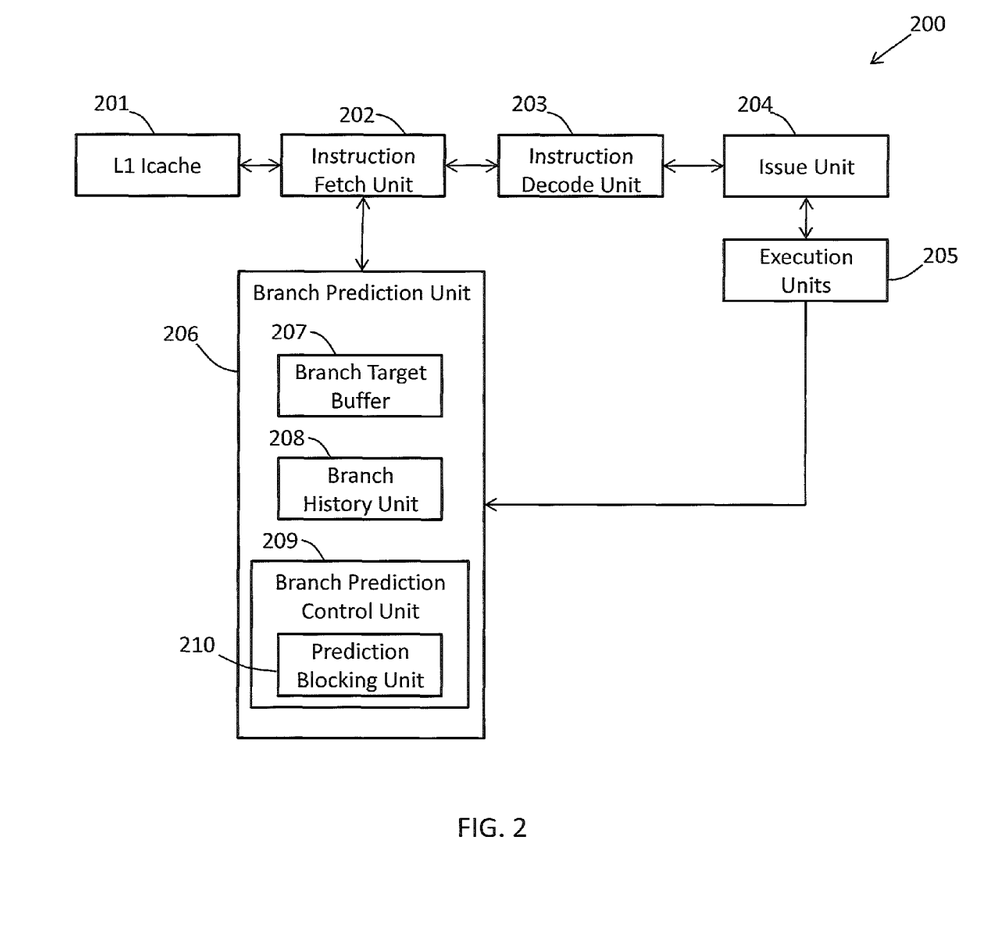
FIG. 2 illustrates an instruction execution assembly according to one embodiment.

FIG. 2 illustrates a block diagram of an instruction execution assembly 200 according to an embodiment of the present disclosure. The instruction execution assembly 200 may correspond to the instruction execution assembly 120 of FIG. 1. For example, in some embodiments one or more of the instruction fetch unit 202, the branch prediction unit 206, and the execution units 205 may correspond to the blocking instruction detection module 123 and the branch prediction blocking module 124. In addition, the fetch unit 202 and the branch prediction unit 206 may correspond to the condition detection module 121 and the blocking instruction insertion module 122 of FIG. 1. Although FIG. 2 illustrates one embodiment of an instruction execution assembly 200, it is understood that embodiments of the present disclosure encompass any instruction execution assembly that detects a blocking instruction and blocks or skips a predetermined number of branch prediction operations based on the detected blocking instruction.

The instruction execution assembly 200 may comprise one processing core of a plurality of processing cores in a multi-threading processor. The instruction execution assembly 200 includes level-1 instruction cache (L1 Icache) 201, which stores program instructions and an instruction fetch unit 202 which fetches the instructions from the L1 Icache 201. In particular, the L1 Icache 201 provides loading of instruction streams in conjunction with the instruction fetch unit 202.

The fetched instructions are decoded by an instruction decode unit (IDU) 203 into instruction processing data. The IDU 203 provides the instructions to an issue unit 204 which controls the issuing of the instructions various execution units 205, such as one or more fixed point units for executing general operations and one or more floating point units for executing floating point operations.

The instruction execution assembly 200 includes a branch prediction unit 206 in communication with the instruction fetch unit 202 for predicting target addresses of branch instructions. For example, the branch prediction unit 206 may include a branch target buffer (BTB) 207 for storing branch target addresses associated with predicted branches. The branch prediction unit 206 may further include a branch history unit 208 for storing patterns of taken and not-taken branch results for previously-resolved branch instructions. The branch history unit 208 may be implemented as part of the BTB 207. In one embodiment, the branch prediction unit 206 includes a branch prediction control unit 209, which may turn on and off the branch prediction function using a prediction blocking unit 210, may analyze the branch history to determined unpredictable branches, and may perform any additional control or analysis functions related to branch prediction functions.

While the branch prediction unit 206 is illustrated as a separate functional block from the instruction fetch unit 202, embodiments of the present disclosure encompass an instruction fetch unit 202 that includes a branch prediction unit 206 within the instruction fetch unit 202. For example, one or more processors, memory, logic, and program code may be shared among the instruction fetch unit 202 and the branch prediction unit 206. In addition, while the branch prediction control unit 209 is illustrated as being separate from the execution units 205, embodiments of the present disclosure encompass execution units 205 that execute blocking instructions to block the instruction fetch unit 202 and branch prediction unit 206 from performing branch prediction operations.

In operation, a stream of instructions flows through the instruction execution assembly 200. The instruction fetch unit 202 may fetch the instructions from the L1 Icache 201 in a predetermined order based on previous instructions. The instruction fetch unit 202 may fetch a block of instructions at once from the L1 Icache 201 and may store the block of instructions, along with any non-decoded instructions from previous fetch operations, in the instruction storage 210.

In one embodiment, the stream of instructions includes a branch prediction blocking instruction having been provided by a user or a compiler. The branch prediction blocking instruction may flow through the pipeline and may be executed by the execution units 205. Based on the execution of the blocking instruction, the execution units 205 may provide control signals to the prediction blocking unit 210 to block branch prediction operations of a predetermined number of following branch instructions. The prediction operations may be blocked, for example, by preventing the instruction fetch unit 202 from accessing the branch target buffer 207. In addition, the execution units 205 may be prevented by the blocking instruction from providing branch information of the predetermined number of branch instructions to the branch history unit 208 when the predetermined number of branch instructions are executed by the execution units 205.

In another embodiment, the instruction fetch unit 202 may identify a particular branch instruction, type of branch instruction, or type of instruction surrounding the branch instructions. The identified particular branch instruction may correspond to a type of branch instruction identified as not having a branch prediction operation performed. A string of instructions may include, for example, the following:

Load, add, store, store, multiply, branch, load, load, add, store

The particular branch instruction or type of branch instruction may be identified, for example, by determining an address of the branch instruction and addresses targeted by the branch instruction. When the particular branch instruction, type of branch instruction, or type of instruction surrounding the branch instructions is identified by the instruction fetch unit 202 or the branch prediction unit 206 the branch prediction control unit 209 may generate an instruction to be inserted into the stream of instructions upstream from the identified branch instruction. Upon execution of the blocking instruction, the execution units 205 may provide control signals to the prediction blocking unit 210 to block branch prediction operations of a predetermined number of following branch instructions. The prediction operations may be blocked, for example, by preventing the instruction fetch unit 202 from accessing the branch target buffer 207. In addition, the execution units 205 may be prevented by the blocking instruction from providing branch information of the predetermined number of branch instructions to the branch history unit 208 when the predetermined number of branch instructions are executed by the execution units 205.

In one embodiment, the branch prediction control unit 209 may analyze the branch prediction history to determine a particular branch instruction that is unpredictable, or that has a level of successful prediction below a predetermined threshold. The branch prediction control unit 209 may store the identified branch instruction information, and may compare the identified branch instruction information to fetched branch instructions to determine whether to generate the blocking instruction.

An example of the insertion of the branch prediction-blocking instruction follows:

Load, add, store, blk_bpl_branch_1, store, multiply, branch, load, load, add, store In the example string of instructions above, the instruction blk_bpl_branch_1 instructs the branch prediction unit 206 and/or the instruction fetch unit 202 to skip one branch prediction operation. In other words, when the next branch is detected in the string of instructions, the instruction fetch unit 202 does not obtain branch prediction information from the BTB 207 of the branch prediction unit 206.

When a branch instruction in the string of instructions is identified, the branch prediction control unit 209 may determine whether a branch prediction operation should be performed, and the instruction fetch unit 202 may consult the branch target buffer 207 to predict which instruction should be fetched to be decoded after the branch instruction. In particular, the branch target buffer 207 may provide the instruction fetch unit 202 with a predicted target address of a predicted branch instruction corresponding to the branch instruction identified by the instruction fetch unit 202, allowing the instruction fetch unit 202 to fetch instructions at the predicted target address.

The fetched instructions are decoded by the instruction decode unit 203 and issued to the appropriate execution units 205 by the issue unit 204 based on a type of operation being carried out by the instruction. The execution units 205 determine whether branch conditions of conditional branch instructions are met, and whether a branch of a conditional branch instruction or an unconditional branch is taken. The execution units 205 may provide the information regarding whether branches have been taken to the branch history unit 208, which may be used to predict future branches.

In embodiments of the present disclosure, the branch-prediction blocking instruction, which may be provided by the branch prediction control unit 209, may include an integer value representing a number of branch instructions for which the branch prediction function should be skipped or blocked. The integer may be any whole number including 1 and up to any desired whole number. Upon blocking branch prediction for a number of branch instructions equal to the integer value, the branch prediction unit 206 and the instruction fetch unit 202 may resume branch prediction operations for branch instructions in the stream of instructions. The instruction provided by the branch prediction control unit 209 may further include information such as a type of branch for which the branch prediction function should be skipped or blocked. In other words, the instruction may prevent branch prediction for a predetermined number of one type of branch instruction while permitting branch prediction operations for all other types of branch instructions.

Figure 3:
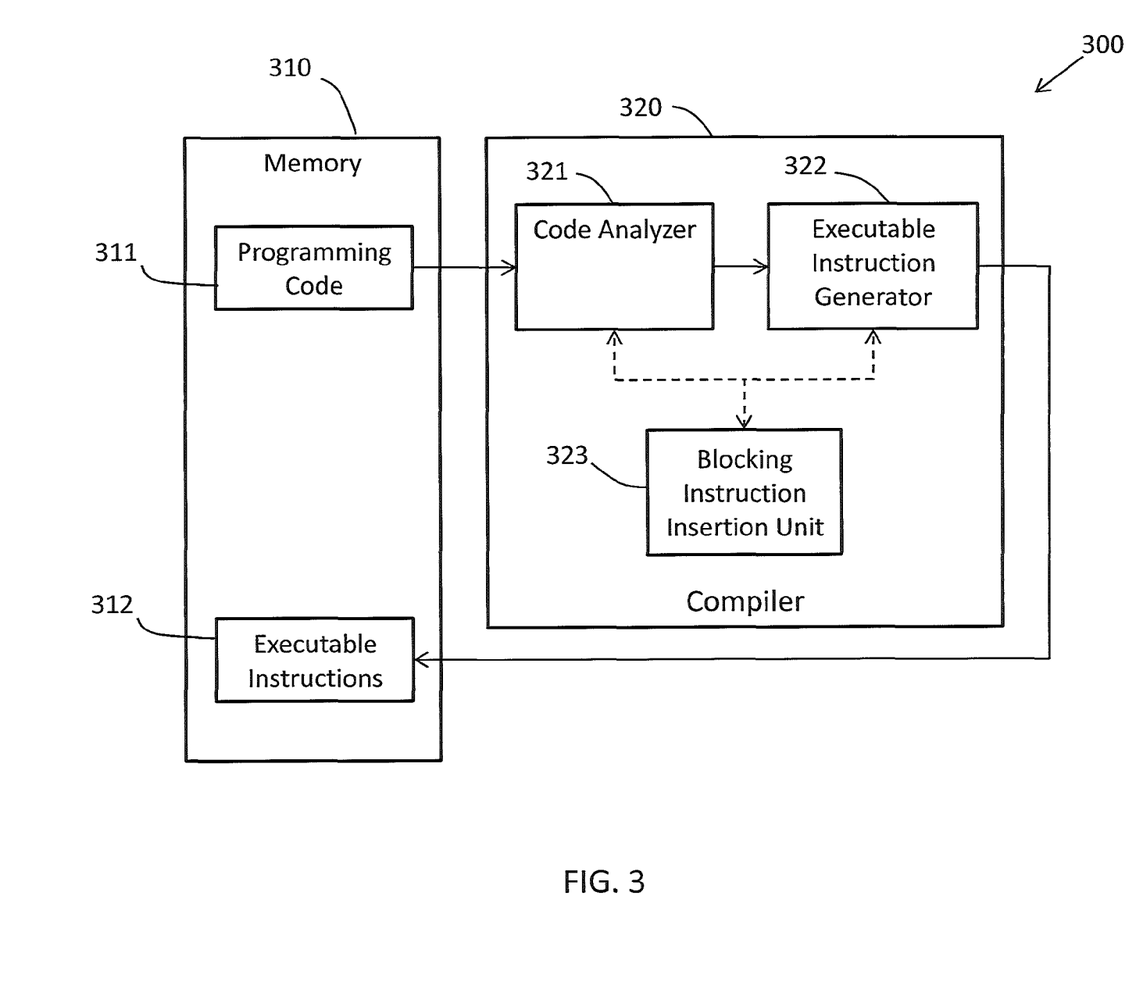
FIG. 3 illustrates an instruction compilation assembly according to one embodiment.

FIG. 3 illustrates a block diagram of an instruction compilation assembly 300 according to an embodiment of the present disclosure. The instruction compilation assembly 300 may correspond to the instruction compilation assembly 110 of FIG. 1, for example.

The instruction compilation assembly 300 includes memory 310 and a compiler 320. The memory 311 may store programming code 311, such as high-level programming code generated by a user or by a computer program. The programming code 311 is provided to a code analyzer 321 of the compiler 323, which may analyze the programming code and based on the analysis, the executable instruction generator 322 may convert the programming code to executable instructions 312 which may be stored in the memory 310. The executable instructions may be read by a processor, such as by the instruction execution assembly 200 of FIG. 2, to execute the instructions to control a computer to perform the functions indicated by the executable instructions 312.

In one embodiment, the programming code includes instructions for blocking branch prediction. A blocking instruction may include a predetermined number of branch instructions that should have branch prediction skipped or blocked following the blocking instruction. The blocking instruction may also include information about a branching instruction, such as a type of branch instruction or a specific branch instruction, that should have the branch prediction function blocked or skipped. The code analyzer 321 may analyze the programming code 311 and may indicate to the executable instruction generator 322 that the blocking instruction of the programming code corresponds to a blocking instruction to be generated by the executable instruction generator 322. The executable instruction generator 322 generates the executable instructions 312 including the blocking instruction. The executable instructions 312 may be generated and stored as a stream of instructions executable in sequence.

In another embodiment, the code analyzer 321 is configured or programmed to analyze the programming code 311 and provide an analysis of the programming code to the executable instruction generator 322 and a blocking instruction insertion unit 323. When the code analyzer 321 analyzes code corresponding to one or more predefined or predetermined conditions, the blocking instruction insertion unit 323 may control either the code analyzer 321 to insert into the programming code 311 an instruction corresponding to a branch prediction blocking instruction. Alternatively, the blocking instruction insertion unit 323 may control the executable instruction generator 322 to insert an executable branch prediction blocking instruction into the string of executable instructions 312. For example, the code analyzer 321 may analyze the programming code 321 and identify a particular branch instruction within the programming code. The blocking instruction insertion unit 323 may recognize the particular branch instruction as being a type of branch instruction for which branch prediction should be skipped or blocked, and may instruct the code analyzer 321 or the executable instruction generator 322 to provide a branch prediction blocking instruction upstream from the particular branch instruction to prevent branch prediction of the particular branch instruction during processing of the executable instructions 312. The blocking instruction may be inserted a predetermined number of instructions upstream such that during processing, interruption of an instruction execution pipeline may be minimized. For example, the blocking instruction may be inserted sufficiently upstream such that when the blocking instruction is executed, the particular branch instruction may not yet have been decoded.

Although FIGS. 1-3 illustrate detecting conditions based on an instruction stream by an instruction execution assembly 200 and an instruction compilation assembly 300, embodiments of the present disclosure encompass any means of detecting conditions based on the instruction stream. For example, in one embodiment a computer program external to the instruction execution assembly 200 may monitor execution of branch instructions and may identify branch instructions for which branch prediction should be blocked. The computer program may provide to the instruction execution assembly 200 or memory the branch-prediction blocking instruction prior to processing a particular branch instruction.

Figure 4:
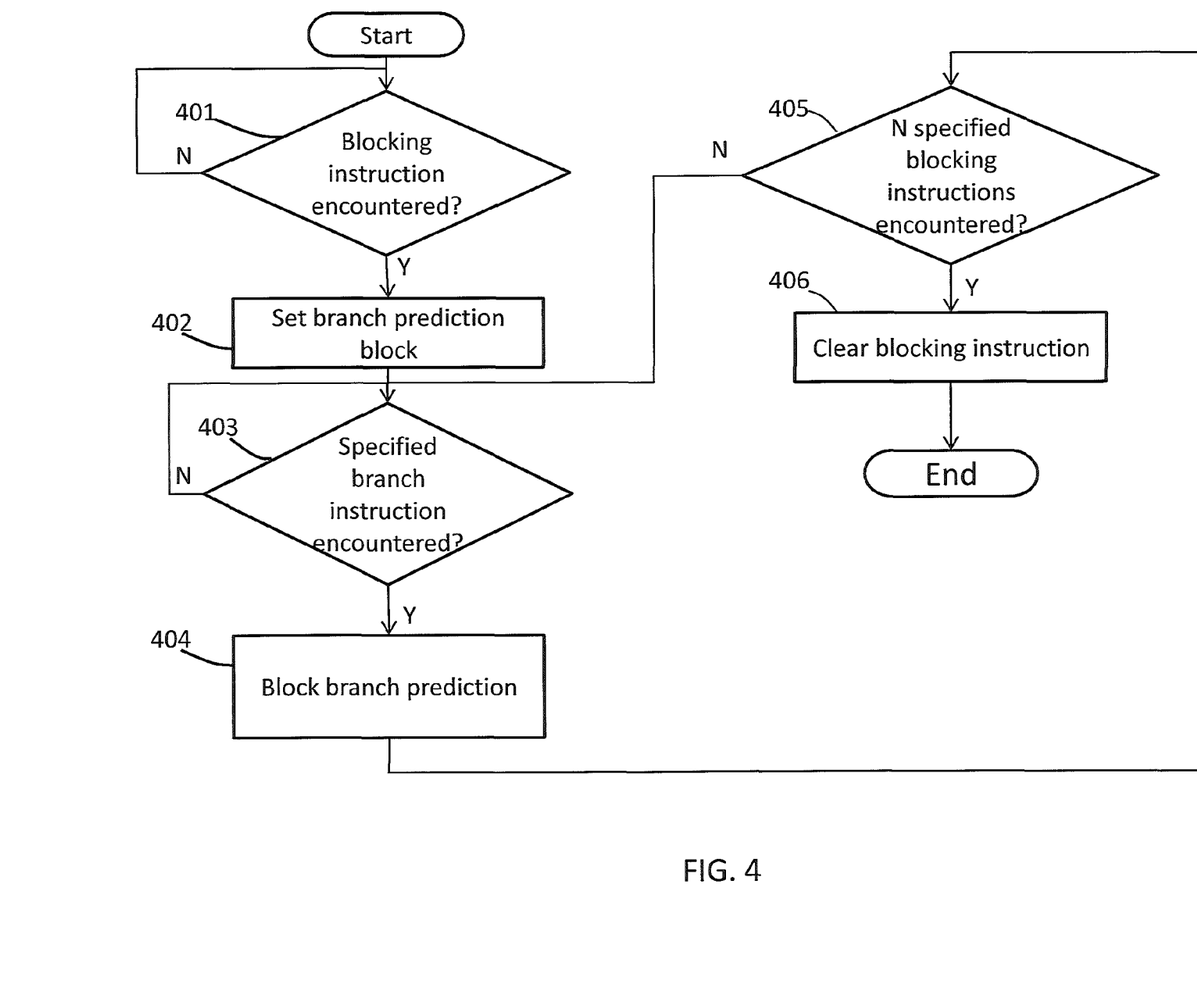
FIG. 4 illustrates a flowchart of a method of selective branch prediction blocking according to one embodiment.

FIG. 4 illustrates a flow diagram of a method according to one embodiment of the present disclosure. In block 401, it is determined whether a branch prediction blocking instruction is encountered during execution of a stream of instructions. For example, an execution unit of an instruction execution pipeline may execute a branch prediction blocking instruction. In block 402, the blocking instruction causes a branch prediction block to be set. For example, an execution unit may provide instructions to an instruction fetch unit to control the instruction fetch unit to not perform a branch prediction operation for a number of branch instructions following the blocking instruction. The number of blocked branch prediction operations is a finite number of 1 or more. In one embodiment, the number is defined in the blocking instruction. In one embodiment, the blocking instruction further specifies a type of branch instruction for which branch prediction should be skipped.

In block 403, it is determined whether a branch instruction is encountered that corresponds to the type of branch instruction for which a branch prediction is not to be performed. If the proscribed branch instruction is detected in block 403, then a branch prediction function is blocked for that instruction in block 404. Blocking the branch prediction may include preventing a fetch unit from accessing a branch target buffer and preventing information from the branch instruction from being entered into the branch target buffer and a branch history unit, for example.

In block 405, it is determined whether a number, N, of branch instructions specified by the branch prediction blocking instruction has been encountered. For example, the branch prediction blocking instruction may include an integer value from 1 to any number greater than 1 to indicate a number of branch instructions for which a branch prediction operation is to be skipped or blocked.

If it is determined in block 405 that the designated number, N, of branch instructions has been encountered, the branch prediction blocking instruction is cleared in block 406, and subsequent branch instructions may be subject to normal branch prediction operations.

Figure 5:
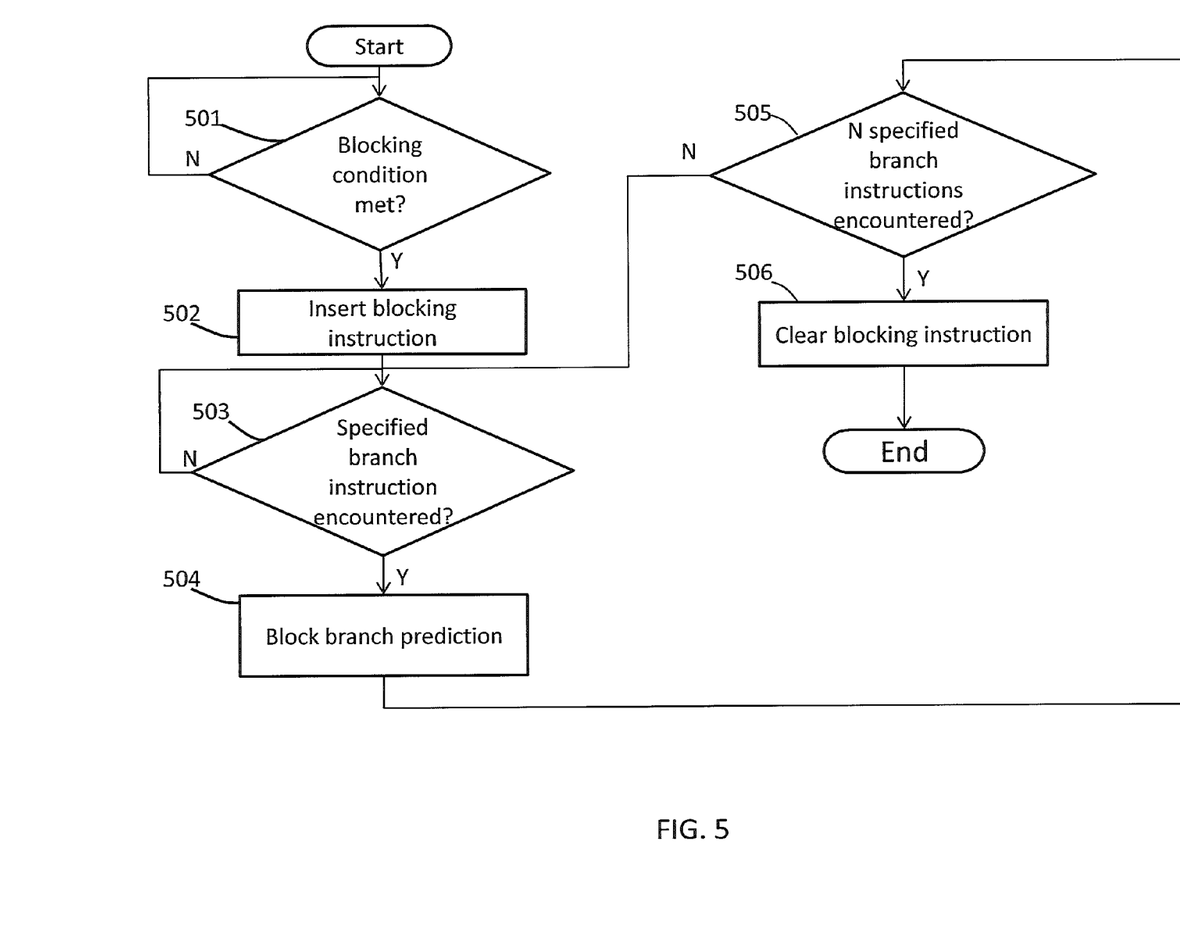
FIG. 5 illustrates a flowchart of a method of selective branch prediction blocking according to another embodiment.

FIG. 5 illustrates a flow diagram of a method according to another embodiment of the present disclosure. In block 501, it is determined whether a branch prediction blocking condition is met. The blocking condition may be based on an identified branch instruction in a stream of fetched instructions, on characteristics of other instructions in the stream of instructions, on pre-programmed instructions regarding when to perform branch prediction or on which types of branch instructions branch prediction should be performed, on an analysis of previous branch instructions, such as a determination that certain branch instructions are unpredictable, or based on any other desired condition.

If the condition is detected in block 501, then a branch prediction blocking instruction is inserted into the stream of instructions in block 502. For example, if the condition relates to an identified branch instruction in a stream of instructions, then the blocking instruction may be inserted upstream of the identified branch instruction to prevent branch prediction of the identified branch instruction. The branch prediction blocking instruction may specify a very narrow range of branch instructions for which branch prediction is skipped, or the branch prediction instruction may prevent branch prediction of any type of conditional branch instruction.

In block 503, it is determined whether a branch instruction is encountered that corresponds to the type of branch instruction for which a branch prediction is not to be performed. If the proscribed branch instruction is detected in block 503, then a branch prediction function is blocked for that instruction in block 504. Blocking the branch prediction may include preventing a fetch unit from accessing a branch target buffer or preventing information from the branch instruction from being entered into the branch target buffer and a branch history unit, for example.

In block 505, it is determined whether a number, N, of branch instructions specified by the branch prediction blocking instruction has been encountered. For example, the branch prediction blocking instruction may include an integer value from 1 to any number greater than 1 to indicate a number of branch instructions for which a branch prediction operation is to be skipped or blocked.

If it is determined in block 505 that the designated number, N, of branch instructions has been encountered, the branch prediction blocking instruction is cleared in block 506, and subsequent branch instructions may be subject to normal branch prediction operations.

Figure 6:
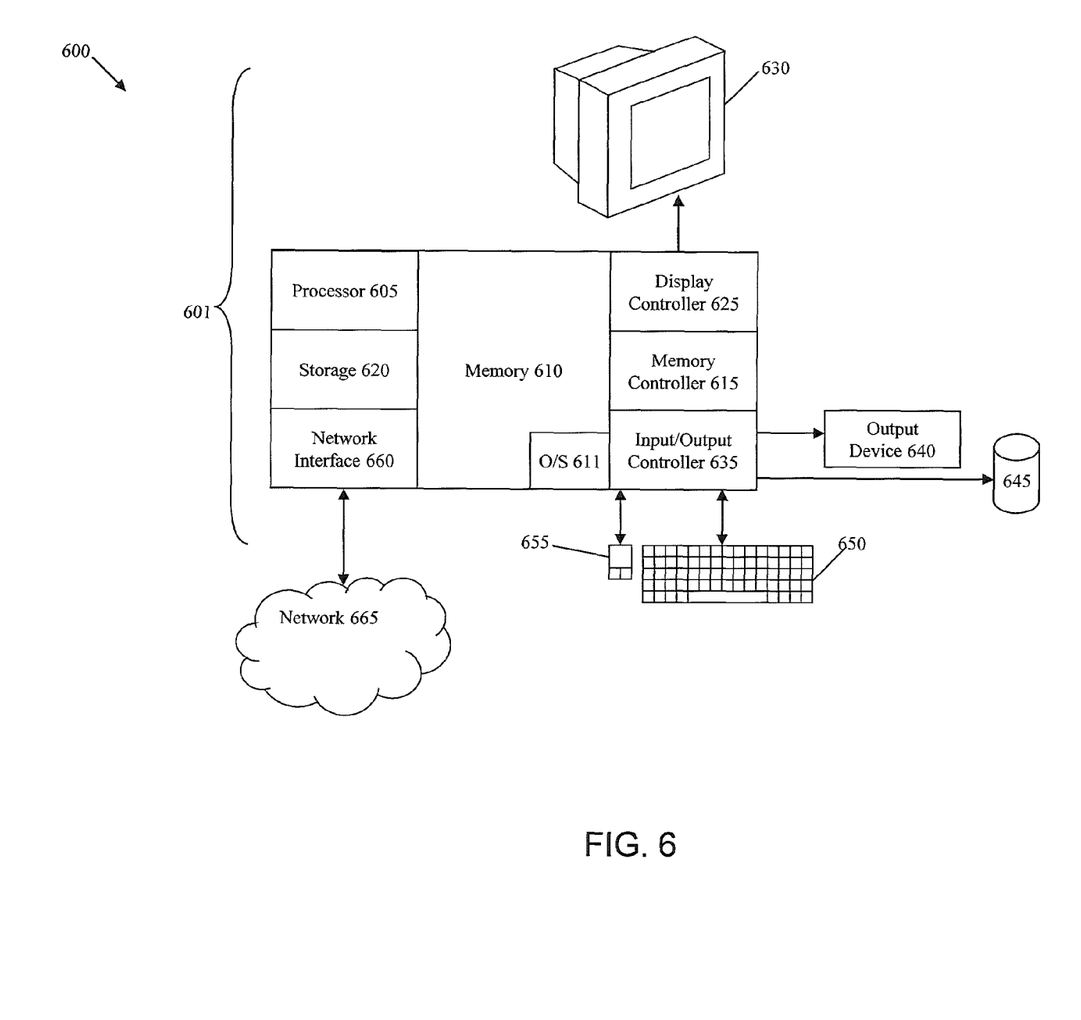
FIG. 6 illustrates a computer system according to one embodiment.

FIG. 6 illustrates a block diagram of a system 600 for selectively blocking branch prediction operations according to one embodiment. The methods described herein can be implemented in hardware, software (e.g., firmware), or a combination thereof. In an exemplary embodiment, the methods described herein are implemented in hardware as part of the microprocessor of a special or general-purpose digital computer, such as a personal computer, workstation, minicomputer, or mainframe computer. The system 600 therefore includes a general-purpose computer 601.

In an exemplary embodiment, in terms of hardware architecture, as shown in FIG. 6, the computer 601 includes a processor 605, which may be a multi-threading processor 605 configured to execute instructions simultaneously or out-of-order, memory 610 coupled to a memory controller 615, and one or more input and/or output (I/O) devices 640, 645 (or peripherals) that are communicatively coupled via a local input/output controller 635. The input/output controller 635 can be, for example but not limited to, one or more buses or other wired or wireless connections, as is known in the art. The input/output controller 635 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 605 is a hardware device for executing software, particularly that stored in storage 620, such as cache storage, or memory 610. The processor 605 can be any custom made or commercially available processor, a central processing unit (CPU), an auxiliary processor among several processors associated with the computer 601, a semiconductor based microprocessor (in the form of a microchip or chip set), a macroprocessor, or generally any device for executing instructions. The processor 605 may include portions of the instruction execution assembly 200 of FIG. 2, such as the branch prediction unit 206, the instruction fetch unit 202, and the branch prediction blocking unit 210.

The memory 610 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 610 may incorporate electronic, magnetic, optical, and/or other types of storage media. Note that the memory 610 can have a distributed architecture, where various components are situated remote from one another, but can be accessed by the processor 605.

The instructions in memory 610 may include one or more separate programs, each of which comprises an ordered listing of executable instructions for implementing logical functions. In the example of FIG. 6, the instructions in the memory 610 a suitable operating system (OS) 611. The operating system 611 essentially controls the execution of other computer programs and provides scheduling, input-output control, file and data management, memory management, and communication control and related services.

In an exemplary embodiment, a conventional keyboard 650 and mouse 655 can be coupled to the input/output controller 635. Other output devices such as the I/O devices 640, 645 may include input devices, for example but not limited to a printer, a scanner, microphone, and the like. Finally, the I/O devices 640, 645 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 600 can further include a display controller 625 coupled to a display 630. In an exemplary embodiment, the system 600 can further include a network interface 660 for coupling to a network 665. The network 665 can be an IP-based network for communication between the computer 601 and any external server, client and the like via a broadband connection. The network 665 transmits and receives data between the computer 601 and external systems. In an exemplary embodiment, network 665 can be a managed IP network administered by a service provider. The network 665 may be implemented in a wireless fashion, e.g., using wireless protocols and technologies, such as WiFi, WiMax, etc. The network 665 can also be a packet-switched network such as a local area network, wide area network, metropolitan area network, Internet network, or other similar type of network environment. The network 665 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 601 is a PC, workstation, intelligent device or the like, the instructions in the memory 610 may further include a basic input output system (BIOS) (omitted for simplicity). The BIOS is a set of essential software routines that initialize and test hardware at startup, start the OS 611, and support the transfer of data among the hardware devices. The BIOS is stored in ROM so that the BIOS can be executed when the computer 601 is activated.

When the computer 601 is in operation, the processor 605 is configured to execute instructions stored within the memory 610, to communicate data to and from the memory 610, and to generally control operations of the computer 601 pursuant to the instructions.

In an exemplary embodiment, selective branch prediction methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

As will be appreciated by one skilled in the art, one or more aspects of the present embodiments may be embodied as a system, method or computer program product. Accordingly, one or more aspects of the present embodiments may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, one or more aspects of the present embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 7:
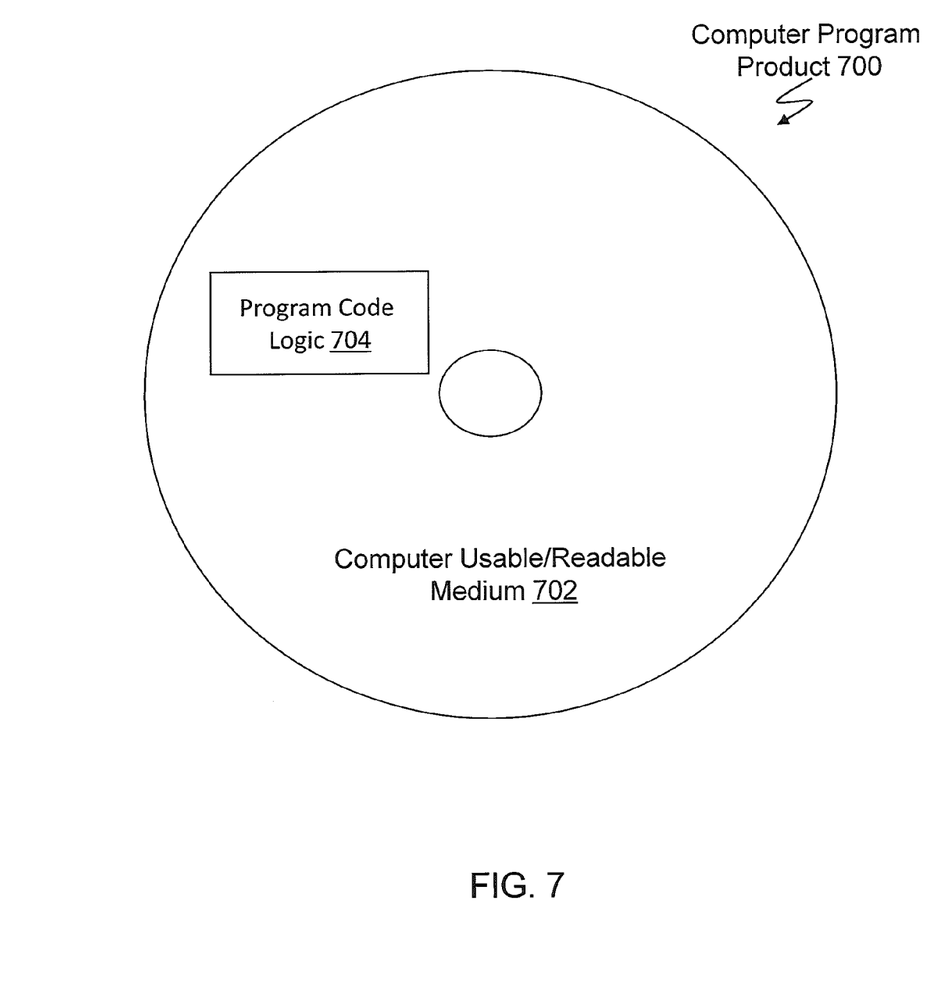
FIG. 7 illustrates a computer-readable medium according to one embodiment of the present disclosure.

Referring now to FIG. 7, in one example a computer program product 700 includes, for instance, one or more storage media 702, wherein the media may be tangible and/or non-transitory, to store computer readable program code means or logic 704 thereon to provide and facilitate one or more aspects of embodiments described herein.

Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit. Such program code may be created using a compiler or assembler for example, to assemble instructions, that, when executed perform aspects of the embodiments.

Embodiments include a computer system, method, computer program product, and any other device or apparatus for performing selective branch prediction. Embodiments include detecting a branch prediction-blocking instruction in a stream of instructions and blocking branch prediction of a predetermined number of branch instructions based on the detecting the branch prediction-blocking instruction. The detecting and blocking may be performed by a processor.

In one embodiment, the predetermined number is specified in the branch-prediction blocking instruction. Another embodiment includes preventing information regarding the predetermined number of branch operations from being stored for later branch prediction operations. The preventing may be performed by a processor.

Another embodiment includes detecting a predetermined condition based on the stream of instructions and inserting the branch-prediction blocking instruction into the stream of instructions based on the detecting the predetermined condition. In one embodiment, the stream of instructions is a stream of instructions in a processing pipeline of a processor, the predetermined condition comprises determining that a fetched branch instruction corresponds to a predetermined type of branch instruction, and inserting the branch-prediction blocking instruction into the stream of instructions includes inserting the branch-prediction blocking instruction upstream from the fetched branch instruction In one embodiment, the predetermined condition is a determination that a branch instruction within the stream of instructions is difficult to predict based on past branch predictions. In one embodiment, the predetermined condition is a characteristic of non-branch instructions in the stream of instructions. Another embodiment includes permitting the branch-prediction operation of branch instructions based on a determination that the predetermined number of branch-prediction operations has been blocked.

Technical effects and benefits include improving processing performance by preventing branch predictions of branch instructions that may result in lower processing efficiency, such as branch instructions that have a history of unpredictability. In addition, the branch predictions may be selectively blocked by providing an instruction for blocking only a predetermined number of branch predictions, including blocking only a next branch prediction operation. Accordingly, in an instruction stream having a large number of branch operations, or in which only a small number of known branch instructions is unpredictable, the number of branch predictions performed may be maximized while targeting only the desired branch instructions as being blocked from having branch predictions performed.

While embodiments of the present disclosure have been described above with respect to prediction and blocking of branch instructions by way of example, it is understood that embodiments of the present disclosure encompass detecting any predetermined type of instruction and inserting a blocking instruction in a stream of instructions to block any type of prediction scheme from being performed.

The terminology used herein is for the purpose of describing particular embodiments only and is not intended to be limiting of embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles and the practical application, and to enable others of ordinary skill in the art to understand the embodiments with various modifications as are suited to the particular use contemplated.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described above with reference to flowchart illustrations and/or schematic diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer system for performing selective branch prediction, the computer system comprising:
    memory configured to store instructions; and
    a processor comprising:
        an instruction fetch unit configured to fetch a stream of instructions from the memory;
        an instruction decode unit configured to decode the stream of instructions;
        an issue unit configured to issue the stream of instructions;
        a plurality of execution units configured to execute the stream of instructions and a branch-prediction blocking instruction; and
        a branch prediction circuit comprising:
            a branch target buffer configured to store a plurality of branch target addresses associated with predicted branches;
            a branch history circuit configured to store a plurality of patterns of taken and not-taken branch results for previously-resolved branch instructions, wherein the branch target buffer is separate from the branch history circuit; and
            a branch prediction control circuit configured to turn on and off a branch prediction function of the branch prediction circuit based on a plurality of control signals provided from the execution units responsive to execution of the branch-prediction blocking instruction to block branch prediction operations of a predetermined number of branch instructions following the branch-prediction blocking instruction, wherein the branch prediction circuit prevents the instruction fetch unit from accessing the branch target buffer for the predetermined number of branch instructions following the branch-prediction blocking instruction and prevents the execution units from providing branch information of the predetermined number of branch instructions to the branch history circuit responsive to execution of the predetermined number of branch instructions by the execution units, and wherein the branch-prediction blocking instruction is generated and inserted into the stream of instructions by the branch prediction control circuit based on detecting a predetermined condition by the branch prediction circuit.

2. The computer system according to claim 1, wherein the predetermined number is specified in the branch-prediction blocking instruction.

3. The computer system according to claim 1, wherein the stream of instructions is a stream of instructions in a processing pipeline of the processor,
    detecting the predetermined condition comprises determining that a fetched branch instruction corresponds to a predetermined type of branch instruction, and
    inserting of the branch-prediction blocking instruction into the stream of instructions includes inserting the branch-prediction blocking instruction upstream from the fetched branch instruction.

4. The computer system according to claim 1, wherein the predetermined condition is a characteristic of non-branch instructions in the stream of instructions.

5. The computer system according to claim 1, wherein the predetermined number of branch instructions is greater than one.

6. A computer program product for performing selective branch prediction, the computer program product comprising:
    a non-transitory storage medium readable by a processor, storing instructions for execution by the processor, wherein the processor comprises an instruction fetch unit configured to fetch a stream of instructions from a memory, an instruction decode unit configured to decode the stream of instructions, an issue unit configured to issue the stream of instructions, a plurality of execution units configured to execute the stream of instructions and a branch-prediction blocking instruction, and a branch prediction circuit comprising a branch prediction control circuit, wherein the execution of the instructions causes the processor to:
    turn on and off, by the branch prediction control circuit, a branch prediction function of the branch prediction circuit based on a plurality of control signals provided from the execution units responsive to execution of the branch-prediction blocking instruction to block branch prediction operations of a predetermined number of branch instructions following the branch-prediction blocking instruction;
    prevent, by the branch prediction control circuit, the instruction fetch unit from accessing a branch target buffer of the branch prediction circuit for the predetermined number of branch instructions following the branch-prediction blocking instruction, wherein the branch target buffer is configured to store a plurality of branch target addresses associated with predicted branches; and prevent, by the branch prediction control circuit, the execution units from providing branch information of the predetermined number of branch instructions to a branch history circuit of the branch prediction circuit responsive to execution of the predetermined number of branch instructions by the execution units, wherein the branch history circuit is configured to store a plurality of patterns of taken and not-taken branch results for previously-resolved branch instructions, and the branch target buffer is separate from the branch history circuit, and wherein the branch-prediction blocking instruction is generated and inserted into the stream of instructions by the branch prediction control circuit based on detecting a predetermined condition by the branch prediction circuit.

7. The computer program product according to claim 6, wherein the predetermined condition indicates that a fetched branch instruction corresponds to a predetermined type of branch instruction.

8. The computer program product according to claim 6, wherein the predetermined number of branch instructions is greater than one.

9. The computer program product according to claim 6, wherein the predetermined number is specified in the branch-prediction blocking instruction.

* * * * *